United States Patent
Brey et al.

(10) Patent No.: US 7,460,978 B1
(45) Date of Patent: Dec. 2, 2008

(54) METHOD, SYSTEM, AND COMPUTER PROGRAM PRODUCT FOR RACK POSITION DETERMINATION USING ACOUSTICS

(75) Inventors: Thomas M. Brey, Cary, NC (US); Richard E. Harper, Chapel Hill, NC (US); Thomas D. Pahel, Jr., Raleigh, NC (US); William J. Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/770,322

(22) Filed: Jun. 28, 2007

(51) Int. Cl.
*G06F 15/00* (2006.01)
(52) U.S. Cl. .................. 702/150; 380/270; 702/159
(58) Field of Classification Search ............ 702/150, 702/159, 185; 380/270; 713/300; 340/572.1, 340/825.49; 73/641, 649; 700/245
See application file for complete search history.

(56) References Cited

U.S. PATENT DOCUMENTS

| 5,699,281 A | 12/1997 | Crucius et al. |
| 6,762,691 B2 | 7/2004 | Piazza |
| 7,071,825 B2 | 7/2006 | VoBa |
| 2005/0138439 A1 | 6/2005 | Rothman et al. |
| 2006/0171538 A1 | 8/2006 | Larson et al. |
| 2006/0217838 A1* | 9/2006 | Sugino et al. ............ 700/245 |

* cited by examiner

*Primary Examiner*—John H Le
(74) *Attorney, Agent, or Firm*—Cynthia S. Byrd, Esq.; Steven M. Greenberg, Esq.; Carey Rodriguez Greenberg & Paul LLP

(57) ABSTRACT

Embodiments of the present invention address deficiencies of the art in respect to equipment position location in a data center and provide a novel and non-obvious method, system and computer program product for rack position determination using acoustics. In one embodiment of the invention, a method for rack position determination using acoustics can be provided. The method can include ultrasonically ranging a first target wall in a data center from a host rack enclosure to acquire range data for the first target wall and ultrasonically ranging a second target wall in the data center from the host rack enclosure to acquire range data for the second target wall. The method further can include translating the range data for the first target wall and second target wall into position coordinates for the host rack enclosure and forwarding the position coordinates to a system administrator for the data center over a coupled data communications network.

8 Claims, 2 Drawing Sheets

METHOD, SYSTEM, AND COMPUTER PROGRAM PRODUCT FOR RACK POSITION DETERMINATION USING ACOUSTICS

BACKGROUND OF THE INVENTION

1. Field of the Invention

The present invention relates to the field of computing equipment management in a data center, and more particularly to rack equipment location in a data center.

2. Description of the Related Art

The modern data center often can be characterized by one or more equipment racks disposed in an environmentally sound room terminating broadband access for a computer communications network. Each rack typically houses several computing components on different shelves or slots defined by the rack. Informational technologists prefer rack mounted computing equipment in order to organize and optimize space utilization in the data center. In particular, the optimization and organization of space can be very important if the equipment must be stored under particular environmental conditions, such as low humidity or low temperature conditions.

In as much as computing components can be obscured within one or more densely packed racks in the data center, tracking the location of each computing component in the data center can be a daunting, albeit necessary task. In this regard, when access to a particular computing component is required, for example in consequence of an alarm emitted by a failing computing component, a system administrator must be able to locate the failing computing component quickly. To facilitate the monitoring and management of rack mounted computing components, system management software can be deployed for use by system administrators. Whereas system management software can monitor components and alert system administrators to impending failure conditions in rack mounted computing components, system management software cannot readily locate the rack mounted computing components in the data center.

At present, systems administrators locate computing components in the data center through manual bar coding schemes and companion databases in which bar code scans of bar codes affixed to components can be matched to a database indicating a physical location of the components in the data center. Recognizing the manual intensive nature of bar coding components, other systems administrators embed an electrical memory within each component in a rack enclosure, each memory storing identification data for the component. The rack enclosure, in turn, can incorporate complementary sensors such that the enclosure can query a proximate component to retrieve the identification data. In consequence, an end user can provide search terms through a user interface to the rack enclosure and an indicator light can illuminate near a component matching the user query.

Knowing the position of computing equipment in a rack enclosure can be helpful, but in a large data center, knowing the position of the rack enclosure itself can be just as important. Specifically, each of power, thermal and acoustic concerns relate directly to the placement of a rack enclosure in a data center. For example, thermal considerations relating to the position of a rack relative to a thermal hotspot in a data center can be important when determining in which computing component to entrust a mission critical workload. As another example, "noisy" racks can be dispersed amongst "quiet" racks to avoid a clustering of noisy elements in the data center. As yet a further example, the thermal signature of each rack can be measured so as to ensure an even distribution of "hot" racks relative to "cool" racks to avoid an overly hot location in the data center.

BRIEF SUMMARY OF THE INVENTION

Embodiments of the present invention address deficiencies of the art in respect to equipment position location in a data center and provide a novel and non-obvious method, system and computer program product for rack position determination using acoustics. In one embodiment of the invention, a method for rack position determination using acoustics can be provided. The method can include ultrasonically ranging a first target wall in a data center from a host rack enclosure to acquire range data for the first target wall and ultrasonically ranging a second target wall in the data center from the host rack enclosure to acquire range data for the second target wall. The method further can include translating the range data for the first target wall and second target wall into position coordinates for the host rack enclosure and forwarding the position coordinates to a system administrator for the data center over a coupled data communications network.

Notably, in one aspect of the embodiment, ultrasonically ranging a second target wall in the data center from the host rack enclosure to acquire range data for the second target wall can include first determining that the range data for the second target wall cannot be acquired. Subsequently, a distance between the second target wall and an opposite target wall can be retrieved from a cooperating rack enclosure over the coupled data communications network. Thereafter, the opposite target wall in the data center can be ultrasonically ranged from the host rack enclosure to acquire range data for the opposite target wall. Finally, the range data for the second target wall can be deduced with the distance and the range data for the opposite target wall.

In another embodiment of the invention, a rack position determination data processing system can be provided. The system can include multiple different rack enclosures in a data center, each communicatively coupled to one another over a data communications network. The system further can include multiple different ultrasonic transducers arranged in a set, each of the ultrasonic transducers arranged to acquire ranging data for a target wall in the data center and each set being disposed in a different one of the rack enclosures. Optionally, each of the ultrasonic transducers can include a mounted rotatable head with a directional indicator indicating a direction of focus for a corresponding one of the ultrasonic transducers. Finally, the system can include position coordinate acquisition logic coupled to each set of ultrasonic transducers. The logic can include program code enabled to reduce acquired ranging data from the ultrasonic transducers in a coupled set into position coordinates for a host one of the rack enclosures in the data center.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for rack position determination using acoustics. In accordance with an embodiment of the present invention, one or more rack enclosures in a data center can be configured with at least two different ultrasonic transducers, each aimed at a different wall of the data center, preferably different walls arranged perpendicularly to one another, so as to acquire ranging data from each different wall. The ranging data can be translated to respective coordinates within the data center and provided to a management console for the data center. In this way, each of the rack enclosures can be associated with different coordinates so as to locate any one of the rack enclosures relative to the other rack enclosures and the walls according to a coordinate system for the coordinates of each of the rack enclosures.

Figure 1:
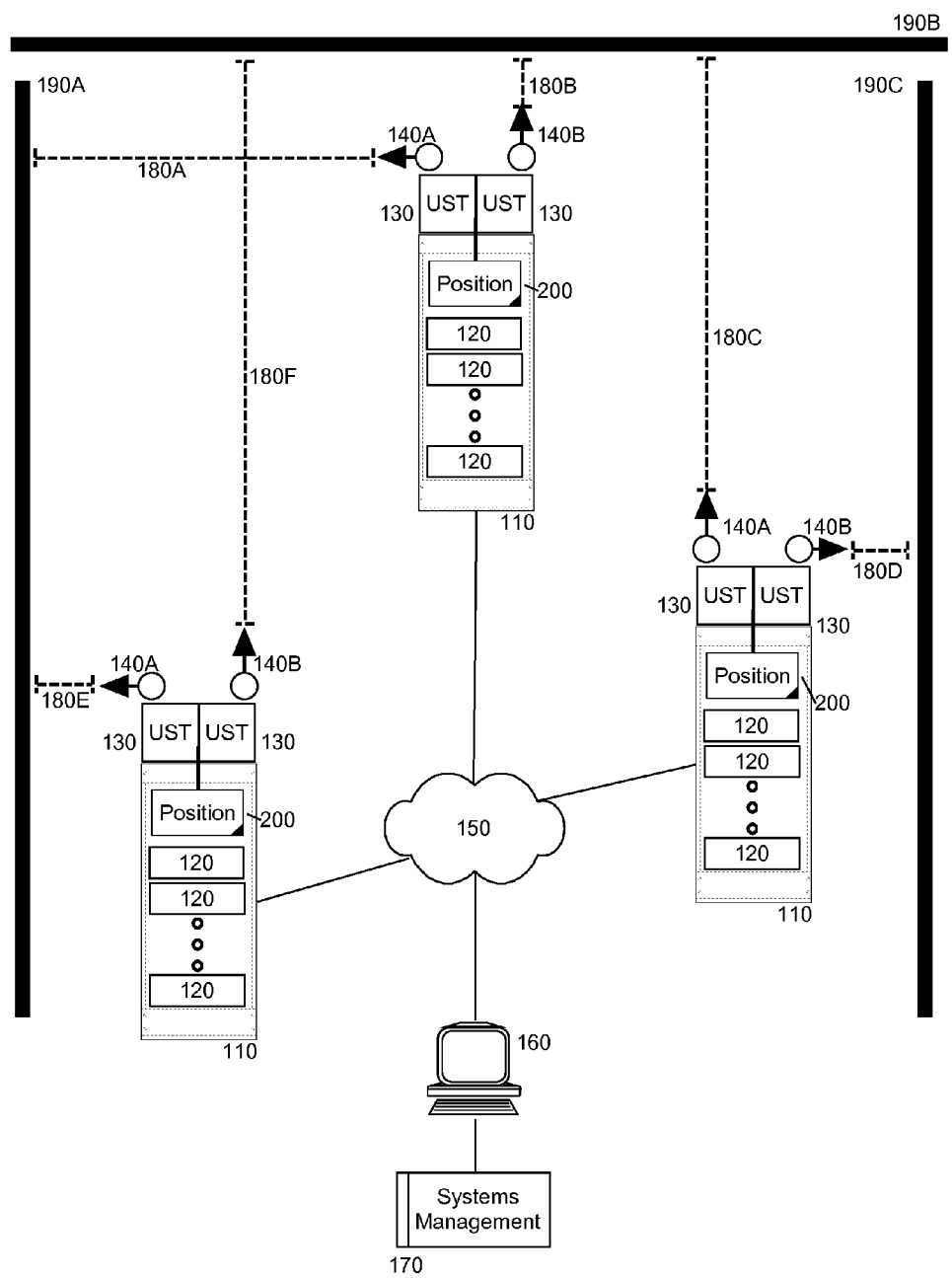
FIG. 1 is a schematic illustration of a data center configured for rack position determination using acoustics; and, FIG. 2 is a flow chart illustrating a process for rack position determination using acoustics.

In illustration, FIG. 1 is a schematic illustration of a data center configured for rack position determination using acoustics. The data center can include one or more rack enclosures 110 coupled to one another over a data communications network 150. Each of the rack enclosures 110 can include one or more rack mounted computing components 120. Notably, each of the rack enclosures 110 further can include one or more ultrasonic transducers 130 and supporting firmware configured to perform ultrasonic ranging for a target. In one aspect of the embodiment, an ultrasonic transducer can be provided for at least two target walls 190A, 190B, 190C, preferably perpendicularly arranged, though it is to be recognized that the rack enclosures 110 themselves may not be arranged at right angle orientations to one another. To that end, in order to provide an indication of the focus of each of the ultrasonic transducers 130, a rotatable head 140A, 140B can be affixed to each of the ultrasonic transducers 130. Each rotatable head 140A, 140B can be directed at a common reference one of the target walls 190A, 190B, 190C and each rotatable head 140A, 140B can include a visual indicator such as an arrow aligned perpendicularly to a corresponding target wall 190A, 190B, 190C. As an alternative, a single rotatable head 140A can be affixed to a single transducer 130 and can be remotely rotated under software control to take transducer readings for different ones of the target walls 190A, 190B without requiring more than one transducer 130.

Position coordinate acquisition logic 200 can be disposed in each of the rack enclosures 110 and coupled to the set of ultrasonic transducers 130. The logic 200 can include program code enabled to receive ultrasonic ranging data 180A, 180B, 180C, 180D, 180E, 180F from the set of ultrasonic transducers 130. The program code of the logic 200 further can be enabled to translate the received ranging data 180A, 180B, 180C, 180D, 180E, 180F into coordinates relative to each target wall 190A, 190B, 190C associated with the ultrasonic transducers of the set of ultrasonic transducers 130. The program code of the logic 200 even yet further can be enabled to deduce ranging data 180A, 180B, 180C, 180D, 180E, 180F, where one or more ultrasonic transducers in the set of transducers 130 cannot resolve the ranging data 180A, 180B, 180C, 180D, 180E, 180F for one or more ones of the target walls 190A, 190B, 190C.

In this regard, so long as the position coordinate acquisition logic 200 for one of the rack enclosures 110 can succeed in acquiring ranging data for the target walls 190A, 190B, 190C, the position coordinate acquisition logic 200 can share the total distance between target walls 190A, 190B with the position coordinate acquisition logic 200 of others of the rack enclosures 110 over the data communications network 150. In consequence, to the extent that the position coordinate acquisition logic 200 can acquire ranging data 180A, 180E for target wall 190A, the ranging data 180D for target wall 190C can be deduced. In any event, once the coordinates of each of the rack enclosures 110 has been determined, the position coordinate acquisition logic 200 can share the coordinates with systems management software 170 executing in host 160.

Figure 2:
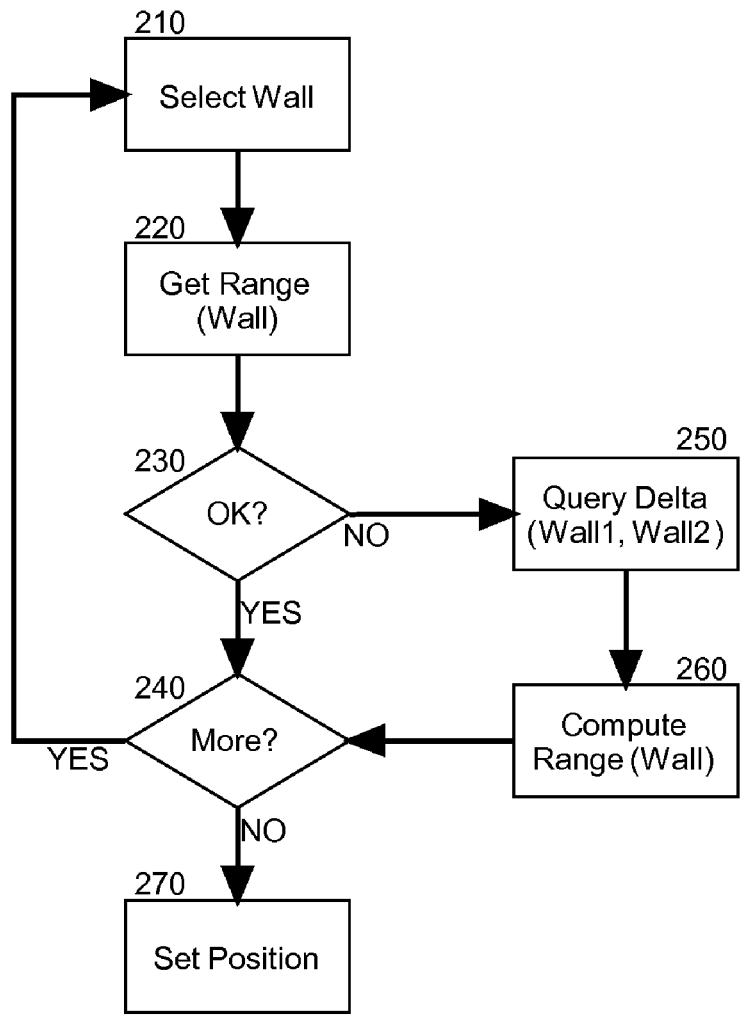

In further illustration, FIG. 2 is a flow chart illustrating a process for rack position determination for host rack enclosure using acoustics. Beginning in block 210, a target wall can be selected for ranging data acquisition for the host rack enclosure and in block 220, ranging data can be received for the target wall through the focused broadcasting of ultrasonic energy in the direction of the target wall and the receipt of reflective ultrasonic energy from the target wall. (Filtering can be applied to filter out reflective ultrasonic energy emanating from a different ultrasonic transducer). In block 230, it can be determined whether ranging data has been successfully received for the target wall. If so, in decision block 240 it can be determined whether additional walls remain to be ranged. If so, the process can repeat through block 210.

In decision block 230, if it is determined that ranging data cannot be resolved for the target wall, in block 250, the distance between the target wall and an opposite target wall can be acquired from a cooperating transducer set for a different rack enclosure. In block 260, using the distance, the ranging data for the target wall can be deduced as the difference between the distance and the ranging data for the opposite target wall for the host rack enclosure. Thereafter, the process can return to block 240 to determine whether additional wall remain to be ranged. If not, the position for the host rack enclosure can be established as a translation of the ranging data for the target walls.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for rack position determination using acoustics comprising:
    ultrasonically ranging a first target wall in a data center from a host rack enclosure to acquire range data for the first target wall;
    ultrasonically ranging a second target wall in the data center from the host rack enclosure to acquire range data for the second target wall;
    translating the range data for the first target wall and second target wall into position coordinates for the host rack enclosure; and,
    forwarding the position coordinates to a system administrator for the data center over a coupled data communications network, wherein ultrasonically ranging a second target wall in the data center from the host rack enclosure to acquire range data for the second target wall, comprises:
        determining that the range data for the second target wall cannot be acquired;
        retrieving a distance between the second target wall and an opposite target wall from a cooperating rack enclosure over the coupled data communications network;
        ultrasonically ranging the opposite target wall in the data center from the host rack enclosure to acquire range data for the opposite target wall; and,
        deducing the range data for the second target wall with the distance and the range data for the opposite target wall.

2. The method of claim 1, wherein ultrasonically ranging a first target wall in a data center from a host rack enclosure to acquire range data for the first target wall, comprises:
    transmitting ultrasonic sound energy in a direction of the first target wall;
    receiving reflected ultrasonic sound energy from the first target wall;
    filtering reflected ultrasonic sound energy transmitted from a different rack enclosure in the data center; and,
    computing a range from the host rack enclosure to the first target wall based upon the received reflected ultrasonic energy.

3. The method of claim 2, wherein ultrasonically ranging a second target wall in a data center from a host rack enclosure to acquire range data for the second target wall, comprises:
    transmitting ultrasonic sound energy in a direction of the second target wall;
    receiving reflected ultrasonic sound energy from the second target wall;
    filtering reflected ultrasonic sound energy transmitted from a different rack enclosure in the data center; and,
    computing a range from the host rack enclosure to the second target wall based upon the received reflected ultrasonic energy.

4. A rack position determination data processing system comprising:
    a plurality of rack enclosures in a data center each communicatively coupled to one another over a data communications network;
    a plurality of ultrasonic transducers arranged in a set, each of the ultrasonic transducer arranged to acquire ranging data for a target wall in the data center and each set being disposed in a different one of the rack enclosures; and,
    position coordinate acquisition logic coupled to each set of ultrasonic transducers, the logic comprising program code enabled to reduce acquired ranging data from the ultrasonic transducers in a coupled set into position coordinates for a host one of the rack enclosures in the data center, wherein
    the program code is further enabled to determine that range data for a target wall cannot be acquired, to retrieve a distance between the target wall and an opposite target wall from a cooperating one of the rack enclosures over the data communications network, and to deduce range data for the target wall with the distance and range data for the opposite target wall.

5. The system of claim 4, wherein each of the ultrasonic transducers comprises a mounted rotatable head with a directional indicator indicating a direction of focus for a corresponding one of the ultrasonic transducers.

6. A computer program product comprising a computer usable medium embodying computer usable program code for rack position determination using acoustics, the computer program product comprising:
    computer usable program code for ultrasonically ranging a first target wall in a data center from a host rack enclosure to acquire range data for the first target wall;
    computer usable program code for ultrasonically ranging a second target wall in the data center from the host rack enclosure to acquire range data for the second target wall;
    computer usable program code for translating the range data for the first target wall and second target wall into position coordinates for the host rack enclosure; and,
    computer usable program code for forwarding the position coordinates to a system administrator for the data center over a coupled data communications network, wherein
    the computer usable program code for ultrasonically ranging a second target wall in the data center from the host rack enclosure to acquire range data for the second target wall, comprises:
        computer usable program code for determining that the range data for the second target wall cannot be acquired;
        computer usable program code for retrieving a distance between the second target wall and an opposite target wall from a cooperating rack enclosure over the coupled data communications network;

computer usable program code for ultrasonically ranging the opposite target wall in the data center from the host rack enclosure to acquire range data for the opposite target wall; and, computer usable program code for deducing the range data for the second target wall with the distance and the range data for the opposite target wall.

7. The computer program product of claim 6, wherein the computer usable program code for ultrasonically ranging a first target wall in a data center from a host rack enclosure to acquire range data for the first target wall, comprises:

computer usable program code for transmitting ultrasonic sound energy in a direction of the first target wall;

computer usable program code for receiving reflected ultrasonic sound energy from the first target wall;

computer usable program code for filtering reflected ultrasonic sound energy transmitted from a different rack enclosure in the data center; and, computer usable program code for computing a range from the host rack enclosure to the first target wall based upon the received reflected ultrasonic energy.

8. The computer program product of claim 7, wherein the computer usable program code for ultrasonically ranging a second target wall in a data center from a host rack enclosure to acquire range data for the second target wall, comprises:

computer usable program code for transmitting ultrasonic sound energy in a direction of the second target wall;

computer usable program code for receiving reflected ultrasonic sound energy from the second target wall;

computer usable program code for filtering reflected ultrasonic sound energy transmitted from a different rack enclosure in the data center; and, computer usable program code for computing a range from the host rack enclosure to the second target wall based upon the received reflected ultrasonic energy.

* * * * *